United States Patent
Choi

[11] Patent Number: 5,940,482
[45] Date of Patent: Aug. 17, 1999

[54] TECHNIQUE FOR DETECTING CALL METERING IN KEY TELEPHONE SYSTEM

[75] Inventor: Hyung-Woon Choi, Ahnyang, Rep. of Korea

[73] Assignee: SamSung Electronics Co., Ltd., Suwon, Rep. of Korea

[21] Appl. No.: 08/736,041

[22] Filed: Oct. 21, 1996

[30] Foreign Application Priority Data

Oct. 20, 1995 [KR] Rep. of Korea ................... 95-36348

[51] Int. Cl.⁶ ................................................. H04M 15/00
[52] U.S. Cl. ........................... 379/124; 379/130; 379/157
[58] Field of Search ................................. 379/114, 115, 379/121, 124, 130, 131, 156, 157, 164

[56] References Cited

U.S. PATENT DOCUMENTS

| | | |
|---|---|---|
| 672,546 | 4/1901 | Bliss . |
| 948,979 | 2/1910 | Stroud . |
| 2,960,637 | 11/1960 | Luscher .................... 379/130 |
| 3,097,266 | 7/1963 | Luscher . |
| 4,001,509 | 1/1977 | McDonald et al. .......... 379/124 |
| 4,065,640 | 12/1977 | Rouiller . |
| 4,146,746 | 3/1979 | de Crepy et al. . |
| 4,513,175 | 4/1985 | Smith . |
| 4,788,719 | 11/1988 | Gupta . |
| 5,048,079 | 9/1991 | Harrington et al. . |
| 5,077,682 | 12/1991 | Kim . |
| 5,291,547 | 3/1994 | Boatwright et al. . |
| 5,748,718 | 5/1998 | Manicone .................. 379/131 |
| 5,809,122 | 9/1998 | Jang ........................ 379/130 |

*Primary Examiner*—Paul Loomis
*Attorney, Agent, or Firm*—Robert E. Bushnell, Esq.

[57] ABSTRACT

A technique for determining call charges for a telephone call in a key telephone system, which when a key telephone subscriber forms a speech path with the central office line subscriber in the key telephone system, checks the call metering during the call time, thereby detecting the call charges. The technique includes: forming a speech path with a central office line receiver by the central office line incoming of a key telephone caller; initializing a metering counter upon forming the speech path; detecting metering pulses from a telephone network, and storing the counted number of metering pulses; upon completion of the telephone call, determining and outputting the call charges; and when the key telephone subscriber is in a metering display mode, displaying the call charges to the key telephone subscriber.

6 Claims, 3 Drawing Sheets

TECHNIQUE FOR DETECTING CALL METERING IN KEY TELEPHONE SYSTEM

CLAIM OF PRIORITY

This application makes reference to, incorporates the same herein, and claims all benefits accruing under 35 U.S.C. §119 from an application for METHOD FOR DETECTING CALL METERING IN KEY PHONE SYSTEM earlier filed in the Korean Industrial Property Office on the 20th day of Oct. 1995 and there duly assigned Ser. No. 36348/1995.

BACKGROUND OF THE INVENTION

1. Field of the Invention

The present invention relates to a private electronic exchange system and, in particular, to a technique for detecting call metering of call traffic of the central office line call of a key telephone subscriber in a key telephone system.

2. Description of the Related Art

Generally, call metering was detected according to the call traffic of a key telephone subscriber in a key telephone system. The call metering of the key telephone system was performed by a telephone exchange office. That is, the telephone exchange office checks the call traffic via a common telephone network (C.O), thereby imposing the call charge to the key telephone subscriber by the checked call traffic.

In earlier key telephone systems, a central processing unit controlled a switching circuit and various other elements to connect a key telephone subscriber with a central office line. The central processing unit in these earlier key telephone systems however could not detect metering pulses supplied from the telephone exchange office of the central office line. Hence, the key telephone system could not precisely determine the call charges. In view of this, only the call time of a telephone call could be displayed on a display unit of the key telephone subscriber. This resulted in the call time being prolonged and the call charges being higher than I believe to be necessary.

One exemplar of early systems, U.S. Pat. No. 672,546 of D. M. Bliss, entitled *Telephone Metering System*, clearly illustrates that the concept of having a telephone metering device at the subscriber end of a telephone line, the metering system receiving a signal from the central office for determining the charges, is in fact old. Similarly, U.S. Pat. No. 3,097,266 and U.S. Pat. No. 4,146,746 to Luscher and de Crepy et al., entitled *Telephone Fee Counter* and *Device For Computing And Displaying The Price Of A Service*, each also use metering systems for determining the call charges at the subscriber end of a telephone line based on monitoring charge pulses on the telephone line. U.S. Pat. No. 4,065,640 to Rouiller entitled *Apparatus For Interconnecting A Telephone Line And A Portable Calculator* also attempts to construct a telephone apparatus that uses charge pulses and other signals from a telephone line to determine the actual call changes at a subscriber end of a telephone line. Both U.S. Pat. Nos. 5,048,079 and 5,291,547 to Harrington et al. and Boatwright et al. entitled *SMDR Translator and Call-Disosition Analyzer*, each endeavor to provide telephone apparatus for PBX systems that are able to use the signals on the trunk lines to determine the call charging information for various subscribers.

I have found that the art, as evidenced by these references, lacks an effective technique for detecting call charges for telephone calls via a key telephone system.

SUMMARY OF THE INVENTION

It is therefore an object of the present invention to provide an improved metering technique for a key telephone system.

It is another object to provide a technique for implementing call metering initiated upon formation of a speech path between a subscriber and a central office via a key telephone system.

It is yet another object to provide a technique for detecting call metering in a key telephone system, which, upon a key telephone subscriber forming a speech path with the central office line subscriber in the key telephone system, checks the call metering as the call time, thereby detecting the metering.

These and other objects can be achieved according to the principles of the present invention with a circuit and process for detecting call charges for a telephone call of a key telephone subscriber in a private electronic exchange system having a metering counter, comprising the steps of forming a speech path with a central office line receiver by the central office line incoming of a key telephone caller; initializing the metering counter upon forming the speech path, detecting a metering pulse from a telephone network, and storing the number of counts counted according to the metering pulse; upon completion of the telephone call, detecting and outputting the call charges; and, when the key telephone subscriber is in a metering display mode, displaying the call charges to the key telephone subscriber.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar elements components, wherein.

DETAILED DESCRIPTION OF THE PREFERRED EMBODIMENTS

Figure 1:
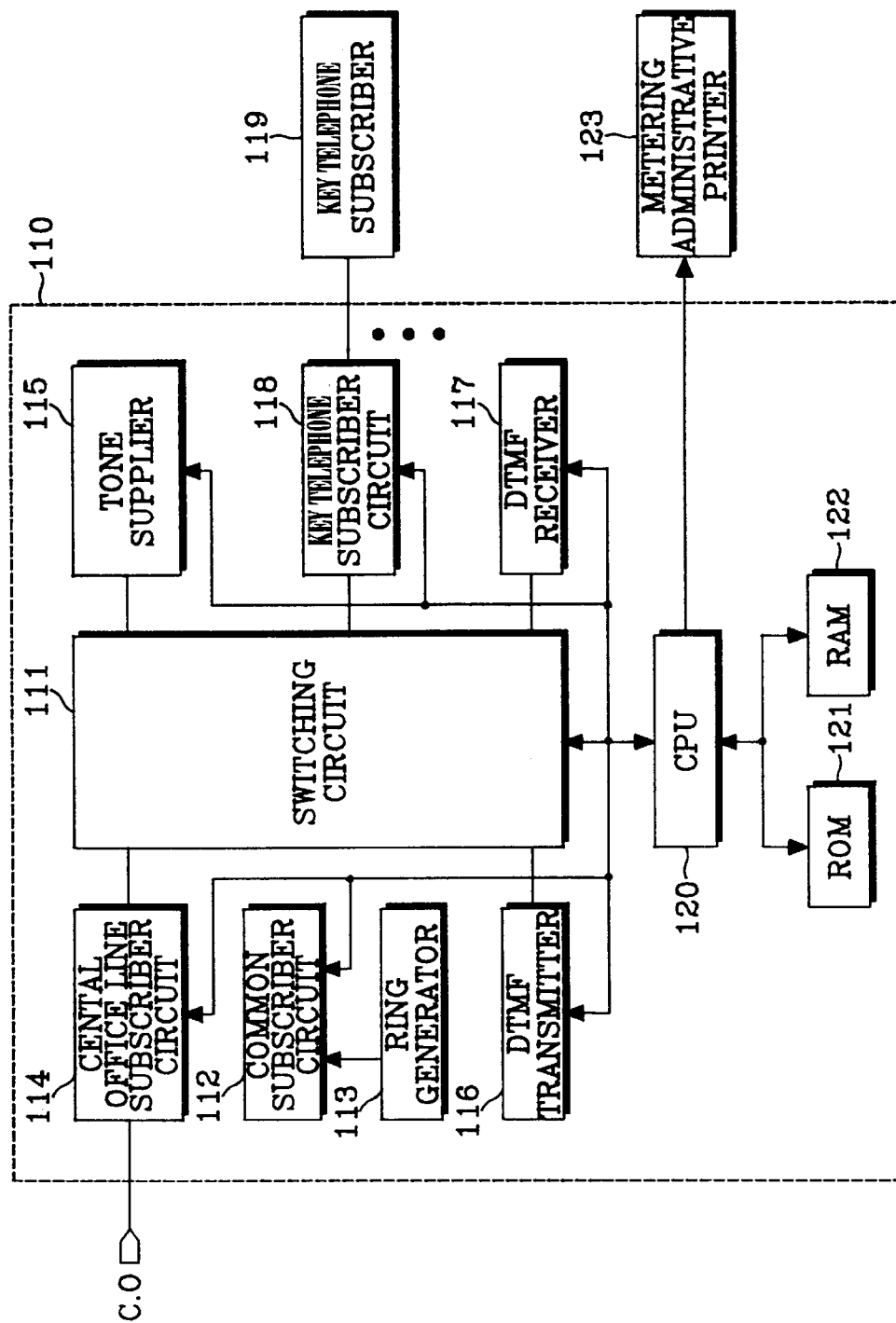
FIG. 1 is a diagram illustrating the construction of a key telephone system.

FIG. 1 is a diagram illustrating the construction of a key telephone system. The construction of FIG. 1 will be described hereinafter with reference to FIG. 1. Key telephone system 110 is constructed with central processing unit 120 (hereinafter, referred to as a CPU) for controlling the call switching and for overall controlling each unit of the key telephone system 110 so as to offer all kinds of services to a user; a read only memory 121 (hereinafter, referred to as a ROM) including program and initial service data of the CPU 120 which basically performs the call and various functions; a random access memory 122 (hereinafter, referred to as a RAM) for temporarily storing the program and processing data of the CPU 120 therein; a common subscriber circuit 112, operating under the control of the CPU 120, for supplying the call current of the voice bandpass to the telephone of an extension subscriber and for interfacing a signal of the key telephone system 110 with the telephone at the same time; a switching circuit 111 for switching various tone and voice data under the control of the CPU 120; a tone supplier 115 for generating various tones under the control of the CPU 120 and for outputting the generated tones to the switching circuit 111; a ring generator 113 for generating a ring signal and for providing a subscriber line with the generated ring signal via the common subscriber circuit 112; a DTMF (dual tone multi frequency) receiver 117 for analyzing a MFC (multi frequency code) generated by the telephone of the extension subscriber and for supplying corresponding digit data to the CPU 120; a DTMF transmitter 116 for generating an MFC signal under the control of the CPU 120 and for outputting the generated MFC signal to the switching circuit 111; a central office line subscriber circuit 114 for forming a central office line call loop by seizure of the telephone network (C.O) under the control of the CPU 120 and for interfacing the signal of the key telephone system 110 with the telephone network (C.O); and a key telephone subscriber circuit 118 which selectively connects the extension and the central office line to a key telephone subscriber 119 under the control of the CPU 120, thereby supplying the power to the key telephone subscriber 119 and interfacing the signal of the key telephone system 110 with the key telephone subscriber 119 at the same time.

Furthermore, the key telephone subscriber 119 connected to the key telephone subscriber circuit 118 is embodied by a key telephone transceiver and a metering administrative printer 123 which is controlled by the CPU 120.

Figure 2:
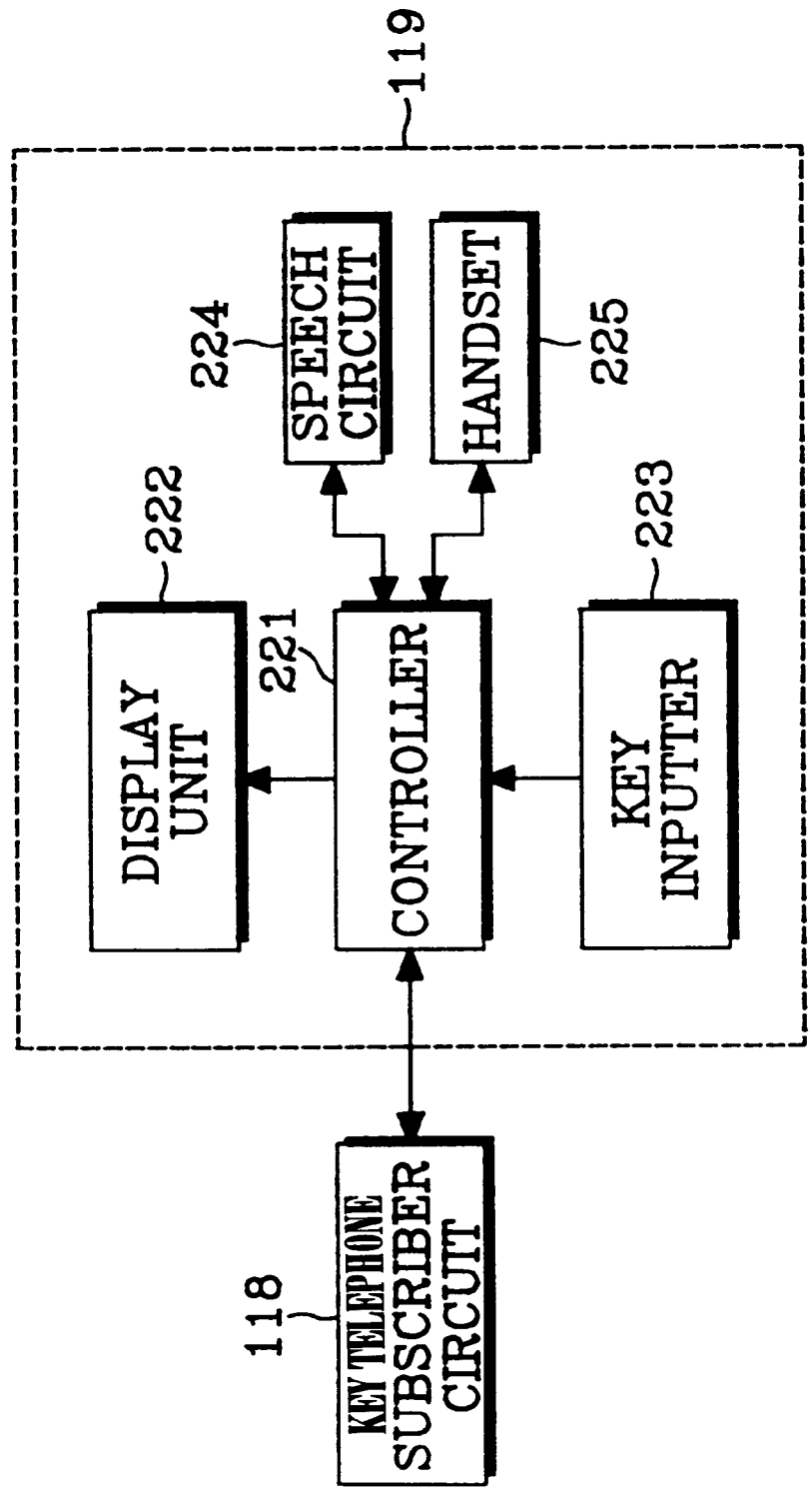
FIG. 2 is a block diagram illustrating the system of a key telephone subscriber interfaced with the key telephone system according to the principles of the present invention.

FIG. 2 is a block diagram illustrating the system of a key telephone subscriber interfaced with the key telephone system. Key telephone subscriber 119 is connected to the key telephone subscriber circuit 118. As illustrated in FIG. 2, the key telephone subscriber circuit 118 includes a key inputter 223, a controller 221 for providing various services depending on the input of the key by the key inputter 223 and for controlling the overall operation of the key telephone subscriber 119, a display unit 222 for displaying information under the control of the controller 221 and embodied by a liquid crystal display (hereinafter, referred to as an LCD), a speech circuit 224 for forming the call loop with the extension under the control of the controller 221, and a handset 225 for receiving voice signals external to the system under the control of the controller 221 and for transmitting the received voice signals external to the system.

When the central office line incoming call is performed through the telephone network (C.O) by the central office fine subscriber circuit 114, the CPU 120 can not detect a metering pulse supplied from the telephone exchange office of the central office line. Hence, the telephone exchange office can not precisely process the metering. Due to this, even in case of on-line state of the central office line, only the call time is displayed by the display unit 222 of the key telephone subscriber 119 by the controller 221. When the call is completed, the metering administrative printer 123 can output only the dialed digits called through the CPU 120. Since the user of the key telephone is absorbed in the call, the deficiency of the call abstention frequently occurs. Accordingly, in this case, the call time can be prolonged and the call charges can become higher and higher.

Figure 3:
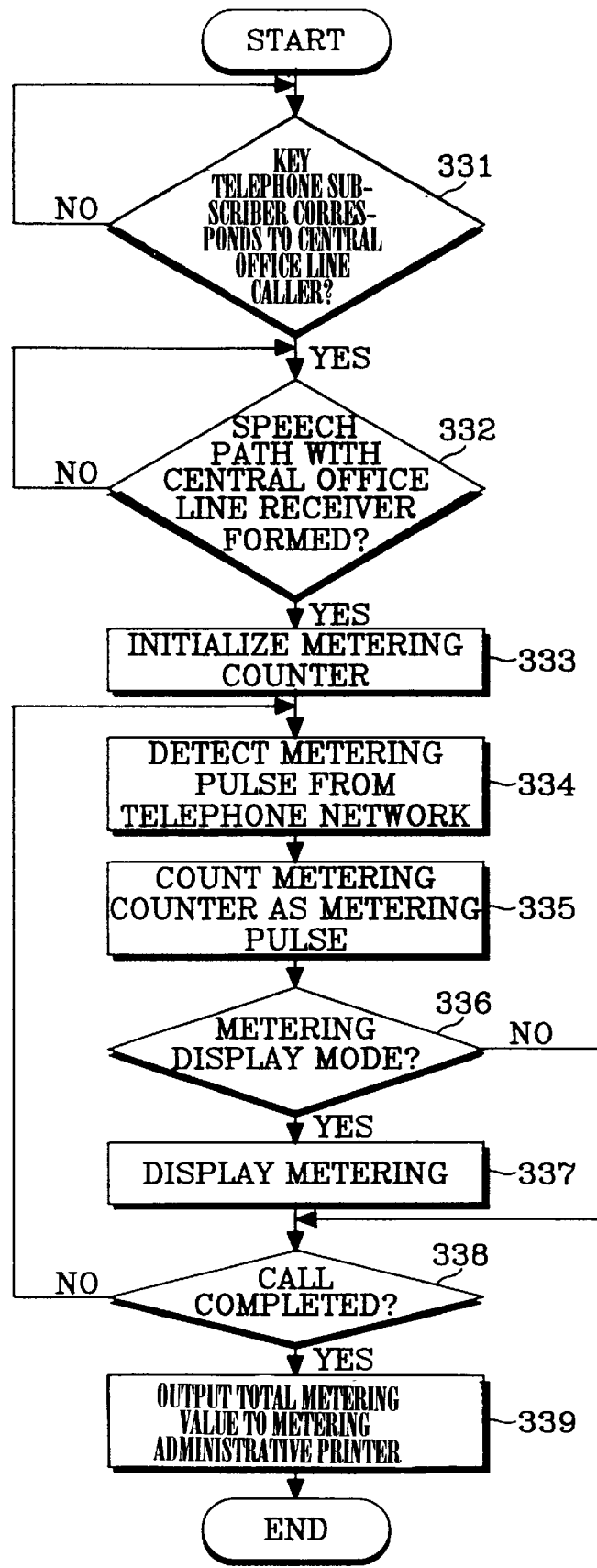
FIG. 3 is a flowchart illustrating the steps of detecting call metering of a key telephone subscriber according to the principles of the present invention.

FIG. 3 is a flowchart illustrating steps of detecting call metering of a key telephone subscriber according to the present invention. In step 331, the key telephone subscriber 119, connected to the key telephone subscriber circuit 118, dials the central office line subscriber through the central office line. When the telephone of the key telephone subscriber 119 is off the hook, the CPU 120 recognizes the off the hook state of the key telephone subscriber 119 by means of the key telephone subscriber circuit 118 and forms a path of the central office line subscriber circuit 114 and the key telephone subscriber 119 under the control of the switching unit 111. Thus, the central office line subscriber 114 forms a path with the telephone exchange office of the telephone network (C.O). When the key telephone subscriber 119 dials the central office line, the dialing is applied through the key telephone subscriber circuit 118 and the switching circuit 111 to the DTMF receiver 117. Then, the DTMF receiver 117 converts the DTMF signal generated by the above dialing into digital data and supplies the converted data to the CPU 120. The CPU 120 analyzes the dialed central office line telephone number. In addition, after being supplied to the DTMF transmitter 116, the central office line telephone number is again converted into DTMF signal, and is transmitted through the central office line subscriber circuit 114 to the telephone network (C.O).

Therefore, the CPU 120 analyzes by the dialing signal, whether the central office line receiver is in an on-line state or in an idle state. When the central office line receiver is in the idle state, in step 332, the CPU 20 forms the speech path to thereby effect the central office line call between the key telephone subscriber 119 and the central office line receiver. In step 333, the CPU 120 including a metering counter initializes the metering counter. As well, a metering pulse signal generated at every given period of time from the telephone network (C.O) through the central office line is inputted through the central office line subscriber 114 to the key telephone system 110. As a consequence, in step 334, the CPU 120 detects the metering pulse signal so as to proceed to step 335. Therein, the CPU 120 determines the count in the metering counter in dependence upon the number of metering pulses and stores the count of the metering counter in the RAM 122. Following that, in step 336, the CPU 120 checks by the key inputter 233, whether or not the key telephone subscriber is in the metering display mode. When it has been determined that the key telephone subscriber is in the metering display mode, in step 337, the CPU 120 displays the metered value in the display unit 222 of the key telephone subscriber 119. In this instance, the metered value is the result of multiplying the unit charge per one metering pulse by the number of metering pulses. That is, the metering depending on the call time is displayed on the LCD of the display unit 222. After that, when the call is completed in step 338, to cut off the speech path, the CPU 120 proceeds to step 339. Herein, the CPU 120 checks the number of metering pulses counted in relation to the call time and determines the call charge. As a result, the metered call charge is printed by the metering administrative printer 123. At this point, an outputted print format may be expressed as in the following table.

TABLE

| TN | E | AC | N | D | T | DU | FG | DT | U | C |
|----|---|----|----|----|----|----|----|----|----|----|

In the above table, TN is designated as a tenant number indicative of the data signal, E (ext) is designated as a key telephone subscriber number, AU is designated as the authorization code, N (number) is designated as the central office line number, D (date) is designated as the call starting month and day when the call is started, T (time) is designated as call starting time when the call is started, DU (duration) is designated as the duration of the call, FG represents whether the kind of call is the incoming signal or the calling signal, DT (digit) is designated as a called dial number, U (unit) is designated as unit call charge per one pulse, and C (charge) is designated as the call charge.

As is apparent from the foregoing, the present invention has an advantage in that the key telephone system 10 can check the metering pulse from the telephone exchange office as well as the call charge due to the metering pulse, thereby displaying the generated metering call charge at the display unit 222 of the key telephone subscriber 119. Hence, while calling, the user recognizes the metering call charge to thereby reduce the call time.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for determining call charges for a telephone call of a key telephone subscriber in a private electronic exchange system having a metering counter, comprising the steps of:

forming a speech path with a central office line receiver by the central office line of a key telephone caller;

initializing said metering counter upon forming said speech path, detecting metering pulses from a telephone network, and counting the number of metering pulses in said metering counter;

upon completion of the telephone call, determining and outputting the call charges; and when said key telephone subscriber is in a metering display mode, displaying the call charges to said key telephone subscriber.

2. The method as recited in claim 1, wherein said call charges and determined by multiplying a unit charge per metering pulse by the number of metering pulses counted by said metering counter.

3. The method as recited in claim 1, further comprising the step of printing the call charges after completion of the telephone call.

4. An apparatus for determining call charges for a telephone call of key telephone subscriber in a private electronic exchange system, comprising:

a metering counter;

a means for forming a speech path with a central office line receiver by the central office line of a key telephone caller;

a means for initializing said metering counter upon forming said speech path, detecting metering pulses from a telephone network, and counting the number of metering pulses in said metering counter;

a means for determining and outputting the call charges upon completion of the telephone call; and a display means for displaying the call charges to said key telephone subscriber when said key telephone subscriber is in a metering display mode.

5. The apparatus as recited in claim 4, wherein said means for determining the call charges multiplies a unit charge for metering pulse by the number of metering pulses counted by said metering counter.

6. The apparatus as recited in claim 4, further comprising a printer for printing the call charges after completion of the telephone call.

* * * * *